US007983650B2

(12) United States Patent
Masuda (10) Patent No.: US 7,983,650 B2
(45) Date of Patent: Jul. 19, 2011

(54) WIRELESS COMMUNICATION DEVICE AND WIRELESS COMMUNICATION SYSTEM

(75) Inventor: Masaya Masuda, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1149 days.

(21) Appl. No.: 11/727,284

(22) Filed: Mar. 26, 2007

(65) Prior Publication Data

US 2007/0232255 A1 Oct. 4, 2007

(30) Foreign Application Priority Data

Mar. 28, 2006 (JP) ................................. 2006-088713

(51) Int. Cl.
*H04B 1/16* (2006.01)
(52) U.S. Cl. ...................... 455/343.2; 375/220; 375/259; 375/356; 375/358; 375/377; 455/343.1; 455/343.3; 455/343.4; 455/343.5; 455/522; 455/574
(58) Field of Classification Search .................. 375/220, 375/259, 356, 358, 377; 455/522, 574, 343.1–343.5
See application file for complete search history.

(56) References Cited

U.S. PATENT DOCUMENTS

| 7,496,077 | B2* | 2/2009 | Zhodzishsky et al. ........ 370/338 |
| 2004/0185821 | A1* | 9/2004 | Yuasa ......................... 455/343.5 |
| 2005/0213593 | A1* | 9/2005 | Anderson et al. ............. 370/419 |
| 2007/0225026 | A1* | 9/2007 | Bennett .......................... 455/522 |

FOREIGN PATENT DOCUMENTS

| JP | 08-009347 | 1/1996 |
| JP | 2000-341222 | 12/2000 |
| JP | 2002-094443 | 3/2002 |
| JP | 2003-069478 | 3/2003 |
| JP | 2003-199002 | 7/2003 |
| JP | 2004-180075 | 6/2004 |
| JP | 2004-227438 | 8/2004 |
| JP | 2005-229363 | 8/2005 |
| WO | WO 96/27987 | 9/1996 |
| WO | WO 03/029989 | 4/2003 |

OTHER PUBLICATIONS

Japanese Office Action dated Dec. 14, 2010.

* cited by examiner

*Primary Examiner* — Shuwang Liu
*Assistant Examiner* — Sung Ahn
(74) *Attorney, Agent, or Firm* — Pillsbury Winthrop Shaw Pittman, LLP (57) ABSTRACT

One embodiment of the invention provides a wireless communication device including: a wireless communication unit that wirelessly receives first power consumption information from a device, the first power consumption information including a plurality of data pieces, each data piece indicating power consumption in the device for processing a streaming data signal encoded in each of a plurality of encoding formats; an encoding format selection unit that selects one of the encoding formats for a data signal to be transmitted, based on the received first power consumption information; and an encoding controller that encodes the data signal to be transmitted in the encoding format selected by the encoding format selection unit to generate an encoded data signal as a streaming data and outputs the encoded data signal to the wireless communication unit, wherein the wireless communication unit wirelessly transmits the encoded data signal as the streaming data to the device.

14 Claims, 7 Drawing Sheets

| ENCODING SYSTEM | ENCODING PARAMETER | POWER CONSUMPTION /UNIT TIME |
|---|---|---|
| mp3 | HIGH-QUALITY AUDIO | Wah |
| mp3 | MIDDLE-QUALITY AUDIO | Wam |
| AAC | HIGH-QUALITY AUDIO | Wbh |
| AAC | MIDDLE-QUALITY AUDIO | Wbm |
| SBC | HIGH-QUALITY AUDIO | Wch |
| SBC | MIDDLE-QUALITY AUDIO | Wcm |
| ⋮ | ⋮ | ⋮ |

WIRELESS COMMUNICATION DEVICE AND WIRELESS COMMUNICATION SYSTEM

CROSS-REFERENCE TO RELATED APPLICATIONS

This application is based upon and claims the benefit of priority from Japanese Patent Application No. 2006-088713, filed Mar. 28, 2006, the entire contents of which are incorporated herein by reference.

BACKGROUND

1. Field

One embodiment of the invention relates to a wireless communication device and a wireless communication system.

2. Description of the Related Art

In recent years, a system has been provided that performs wireless communication between battery-operated wireless communication devices, in particular a system in which audio and video streaming data is transmitted and the audio/video is listened to/viewed by the user. In an example of such a system, audio data is reproduced on a music reproducing device, and the streaming audio data is transmitted over wireless communication such as Bluetooth® and the user enjoys the music with a wireless headphones.

In such a system, control is made to extend an available communication time in accordance with the remaining battery power of a device. Japanese Patent Application Publication (KOKAI) No. 2005-229363 discloses a wireless video communication device capable of reducing the number of frames encoded in case a drop in the battery voltage is detected and extend the battery run time.

Considering a case where both the device and the distant wireless communication device are battery-operated, the remaining power and battery run time usually depend on the capacity of the mounted battery and remaining battery power at the beginning of the current communication session as well as power consumption of an individual device. When the battery of a device of the distant party runs out although the battery power of another device is high enough, the user can no longer receive streaming data. The approach described in Japanese Patent Application Publication (KOKAI) No. 2005-229363 considers only the remaining battery power of a local device and fails to solve this problem.

Many of the wireless communication devices that transmit streaming data support a plurality of encoding formats. Power consumption of such a wireless communication device usually depends on an encoding system used and the software or hardware configuration of a wireless communication device even using the same encoding format.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a wireless communication device includes: a wireless communication unit that wirelessly receives first power consumption information from a device, the first power consumption information including a plurality of data pieces, each data piece indicating power consumption in the device for processing a streaming data signal encoded in each of a plurality of encoding formats; an encoding format selection unit that selects one of the encoding formats for a data signal to be transmitted, based on the received first power consumption information; and an encoding controller that encodes the data signal to be transmitted in the encoding format selected by the encoding format selection unit to generate an encoded data signal as a streaming data and outputs the encoded data signal to the wireless communication unit, wherein the wireless communication unit wirelessly transmits the encoded data signal as the streaming data to the device.

Figure 1:
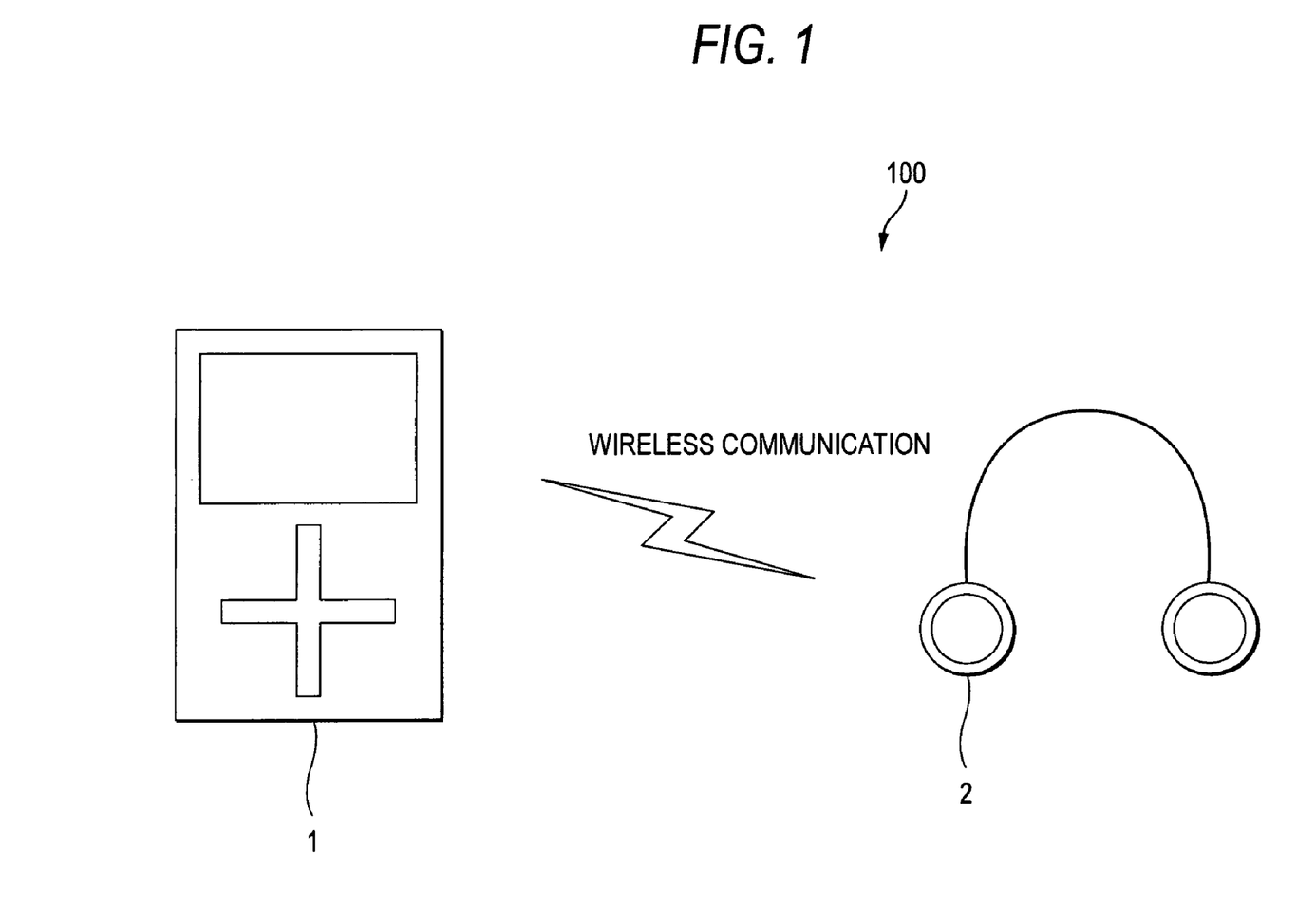
FIG. 1 shows an exemplary configuration of a wireless communication system according to an embodiment of the invention.

FIG. 1 shows an exemplary configuration of a wireless communication system according to an embodiment. As shown in FIG. 1, a wireless communication system 100 includes a music reproducing device 1 and headphones 2.

The music reproducing device 1 includes a storage medium therein and encodes the audio data stored on the storage medium as streaming data, or pre-encoded audio data stored on the storage medium, and transmits the encoded data to the headphones 2 as a data signal of a predetermined encoding format.

The headphones 2 decode the data signal received from the music reproducing device 1 and outputs sound from a speaker.

Wireless communication used by the music reproducing device 1 to transmit the data signal of music data to the headphones 2 is assumed to be Bluetooth communication. In this embodiment, the data signal of music data is communicated via Bluetooth using Advanced Audio Distribution Profile (A2DP) while a control signal used to play or stop music is communicated via Bluetooth using AVRCP (Audio/Video Remote Control Profile).

Further, the headphones 2 have a feature to inform the music reproducing device 1 of information about a remaining power of the battery (remaining power information) and information about power consumption (power consumption information by encoding format) corresponding to an encoding format supported by the headphones 2. In this embodiment, a combination of an encoding system and an encoding parameter is called an encoding format.

The music reproducing device 1 selects an encoding format that assures the longest available communication time (available reproducing time) of the entire wireless communication system 100 based on the remaining power information and its power consumption information by encoding format and generates a data signal of audio data as streaming data to be transmitted.

To notify or acquire such remaining power information of the battery or power consumption information by encoding format, for example, the Vendor Unique command or Vendor Dependent command that each vendor can expand or define in AVRCP may be used. While the following description pertains to a case where AVRCP is used, such information may be notified or acquired using Serial Port Profile (SPP) or the like.

Figure 2:
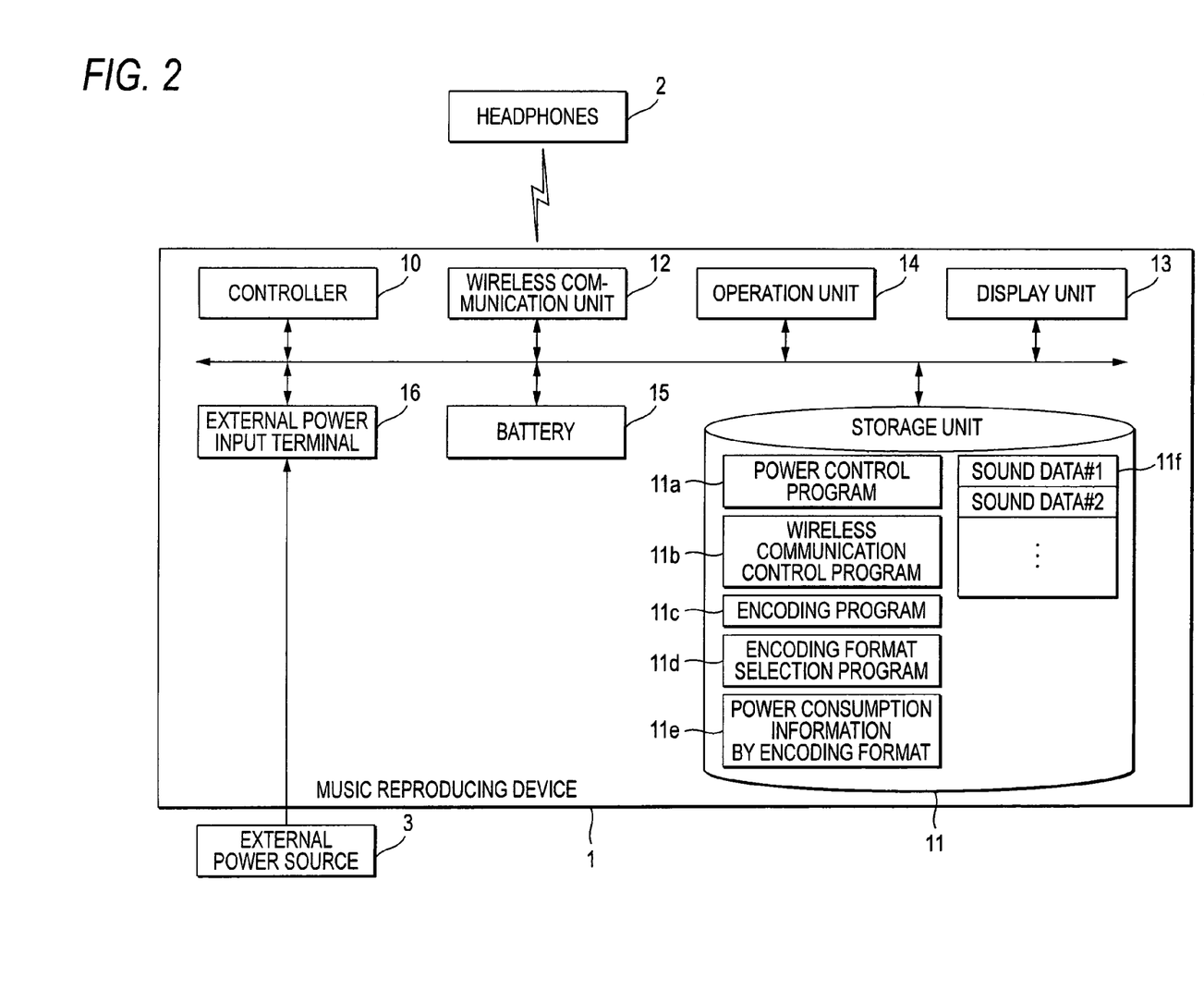
FIG. 2 shows an exemplary configuration of a music reproducing device according to the embodiment.

FIG. 2 shows an exemplary configuration of the music reproducing device 1. The music reproducing device 1 includes a controller 10, a storage unit 11, a wireless communication unit 12, a display unit 13, an operation unit 12, a battery 15, and an external power input terminal 16.

The music reproducing device 1 is driven by the battery 15 and operated under control of a power control program 11a, a wireless communication control program 11b, an encoding program 11c, an encoding format selection program 11d, and another program or the like (not shown) stored by the controller 10 into the storage unit 11. In particular, the music reproducing device 1 encodes as streaming data the audio data 11f stored in the storage unit 11 by the encoding program 11c and wirelessly transmits a data signal via the wireless communication unit 12 under the control of the wireless communication control program 11b.

The controller 10 reads the power control program 11a, the wireless communication control program 11b, the encoding program 11c and the encoding format selection program 11d from the storage unit 11 and controls the components of the music reproducing device 1. An example of the controller 10 is a Central Processing Unit (CPU).

The storage unit 11 is a storage medium such as a Hard Disk Drive (HDD) or a flash memory. The storage unit 11 stores the power control program 11a, the wireless communication control program 11b, the encoding program 11c, the encoding format selection program 11d, the power consumption information by encoding format 11e and multiple pieces of audio data 11f.

The power control program 11a has a feature to detect the remaining power (voltage) of the battery 15. The power control program 11a also has a feature to determine whether the battery is supplying power and whether an external power source 3 is supplying power thorough the external power input terminal 16.

The wireless communication control program 11b is a program designed to control the wireless communication unit 12 and control Bluetooth communication to/from the headphones 2. That is, the wireless communication unit 12 establishes a Bluetooth-based wireless connection to/from the headphones 2 to communicate a data signal or a control signal under the control of the wireless communication control program 11b.

When the encoding operation by the encoding program 11c is over or streaming communication is no longer available depending on the remaining power, the wireless communication control program 11b disconnects the ongoing wireless connection with the headphones 2. With this approach, the music reproducing device 1 and the headphones 2 need not consume power necessary to maintain the wireless connection even after music reproduction is over.

The encoding program 11c is a program designed to perform encoding operation of the audio data 11f stored in the storage unit 11. Specifically, the encoding program 11c reads the audio data 11f in the storage unit 11 and converts the audio data 11f to a data signal using an encoding system and an encoding parameter selected by the encoding format selection program 11d. The data signal generated by the encoding program 11c by the encoding operation is passed to the wireless communication unit 12 and transmitted to the headphones 2 via Bluetooth communication using A2DP.

Encoding systems that are supported by the encoding program 11c and that converts to a data signal, include MPEG-1 Audio layer 3 (mp3), Advanced Audio Coding (AAC), and Sub Band Codec (SBC) or the like.

While a parameter used in encoding by the encoding program 11c is a single type of parameter relating to audio quality such as "high-quality audio" and "middle-quality audio" in this embodiment, more than one parameter may be used. Examples of encoding parameters include bit rates, sampling frequencies, and stereo/monaural settings.

The encoding format selection program 11d calculates a predicted available communication time (predicted available reproducing time) of the music reproducing device 1 and the headphones 2 for encoding formats supported by both the music reproducing device 1 and the headphones 2 and selects an encoding format by which the longest predicted available communication time is achieved.

Figure 3:
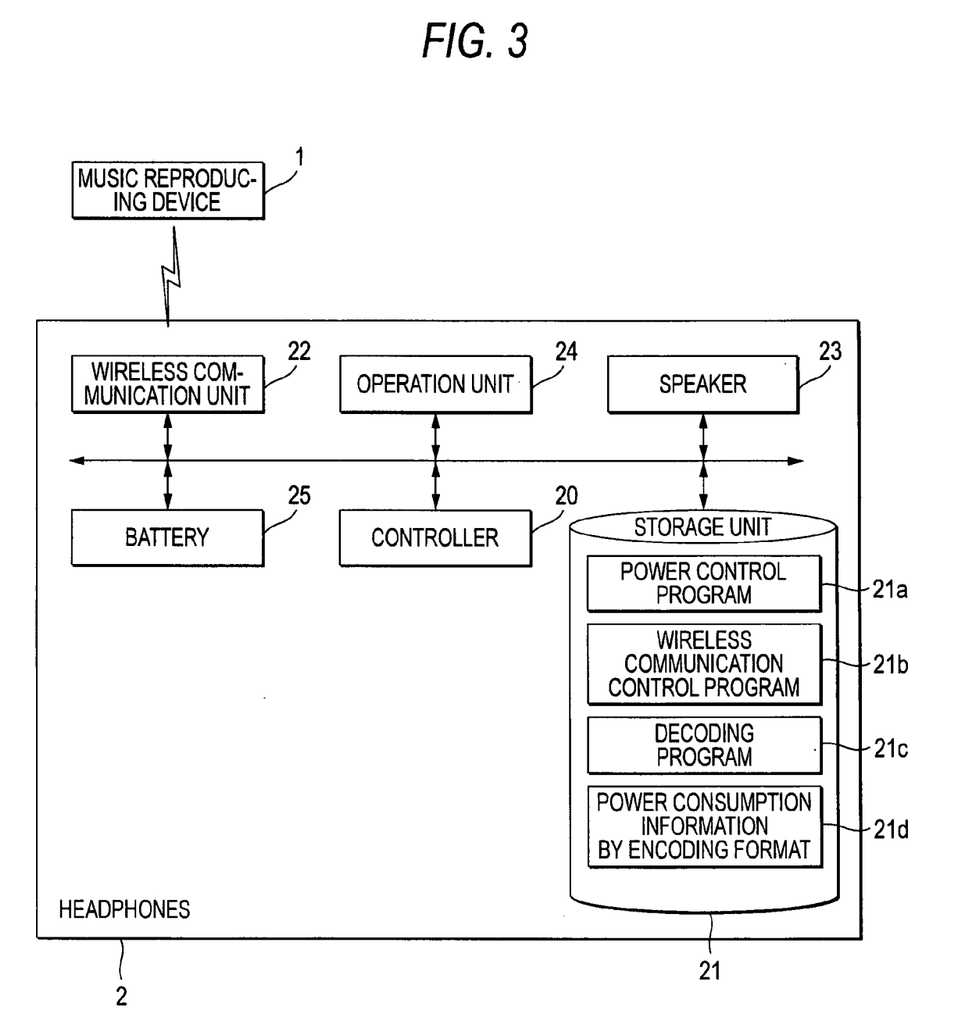
FIG. 3 shows an exemplary configuration of headphones of the wireless communication system according to the embodiment.

The encoding format selection program 11d calculates a predicted available communication time based on the power consumption information by encoding format 21d and information about the remaining power of the battery 25 received by the wireless communication unit 22 and the remaining power of the battery 15 and power consumption information by encoding format 11e detected by the power control program 11a.

The predicted available communication time, that is, the available reproducing time in an encoding format of each of the music reproducing device 1 and the headphones 2 is obtained by dividing the remaining power of each of the music reproducing device 1 and the headphones 2 by the power consumption per unit time for the encoding format. The predicted available communication time of the entire wireless communication system 100 for the encoding format is the shorter of the predicted available communication times of both devices. The music reproducing device 1 selects an encoding format by which the longest predicted available communication time of the entire wireless communication system 100 is achieved.

When the power supply source of the music reproducing device 1 is not the battery 15 but the external power source 3 (that is, when the external power input terminal 16 is connected to the external power source 3), the remaining power is not concerned so that the predicted available communication time of the music reproducing device 1 is assumed as infinite. The encoding format selection program 11d thus selects an encoding format based on the predicted available communication time of the headphones 2 alone.

The power consumption information by encoding format 11e is the power consumption amount per unit time by each encoding format supported by the encoding program 11c. Specifically, the power consumption information by encoding format 11e is a table of values indicating the sum of the power consumption necessary for the encoding program 11c to perform encoding operation, that is, to generate a data signal from the audio data 11f and the power consumption necessary for the wireless communication unit 12 to transmit a data signal under the control of the wireless communication control program 11b. In other words, power consumption of a particular encoding format (encoding system and encoding parameter)=power consumption of encoding operation+power consumption of wireless communication. In other words, power consumption information by encoding format 11e includes a plurality of data pieces. Each data piece indicates power consumption in the music reproducing device 1 for processing the audio data 11f to be encoded in each of the plurality of encoding formats.

When the encoding format of audio data 11f stored in the storage unit 11 is same as the encoding format of a data signal to be encoded by the encoding program 11c and transmitted as streaming data from the wireless communication unit 12, the encoding operation is no longer necessary so that the power consumption is generally very low. For example, when the audio data 11f is an mp3 format and the headphones 2 (decoding program 21c described later) is able to decode mp3 format, conversion between encoding systems is not required and the power consumption of mp3 is usually the lowest of all encoding systems.

While detailed later, the headphones 2 also have the power consumption information by encoding format 21d. While in this embodiment the music reproducing device 1 receives or acquires the power consumption information by encoding format 21d on the wireless communication unit 12 by using the Vendor Unique command or Vendor Dependent command of AVRCP as a Bluetooth profile, it is possible to define commands over SPP and receive or acquire the power consumption information by encoding format 21d on the wireless communication unit 12 by using the command.

Figure 4:
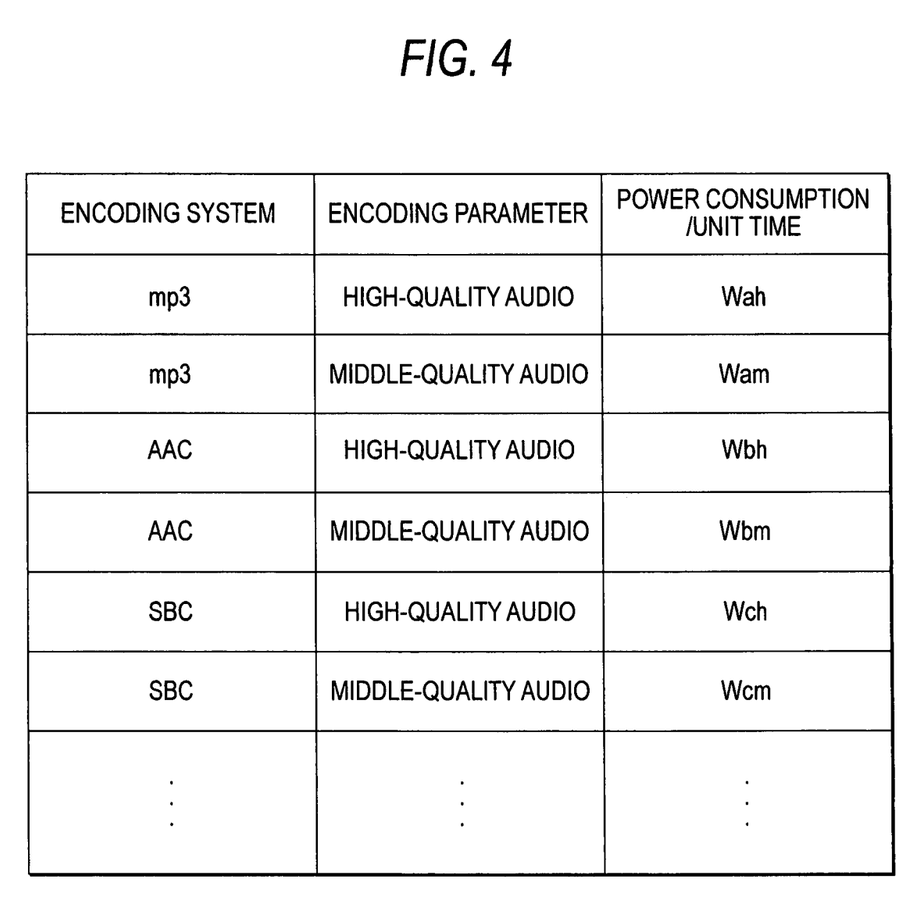
FIG. 4 shows an example of power consumption information by encoding format of the music reproducing device according to the embodiment.

FIG. 4 shows an example of the power consumption information by encoding format 11e (the power consumption information by encoding format 21d described later has the same format). In the example shown in FIG. 4, the encoding program 11c supports mp3, AAC and SBC as encoding systems and "high-quality audio" and "middle-quality audio" as encoding parameters of each encoding system.

SBC is an encoding system essential to A2DP. A Bluetooth wireless communication device supporting A2DP necessarily conforms to the SBC encoding system. A2DP optionally supports mp3 or AAC. A Bluetooth wireless communication device supporting A2DP does not necessarily conform to mp3 or AAC.

In the example of the power consumption information by encoding format 11e shown in FIG. 4, power consumption per unit time (or simply, power consumption) is Wah when the encoding system is mp3 and the encoding parameter is "high-quality audio"; Wam when the encoding system is mp3 and the encoding parameter is "middle-quality audio"; Wbh when the encoding system is AAC and the encoding parameter is "high-quality audio"; Wbm when the encoding system is AAC and the encoding parameter is "middle-quality audio"; Wch when the encoding system is SBC and the encoding parameter is "high-quality audio"; and Wcm when the encoding system is SBC and the encoding parameter is "middle-quality audio".

While a single type of encoding parameter related to the audio quality for setting "high-quality audio" or "medium-quality audio" is described as an encoding parameter in the power consumption information by encoding format 11e in this embodiment, more than one encoding parameter may be used as described earlier. For example, multiple types of parameters such as the bit rates, sampling frequencies, and number of stereo/monaural channels may be supported by the encoding program 11c and described in the power consumption information by encoding format 11e.

The audio data 11f is data related to audio encoded in a predetermined encoding format such as mp3 or SBC and stored in the storage unit 11 in advance.

The wireless communication unit 12 is a wireless communication interface for communicating with the headphones 2 under the control of the wireless communication control program 11b. As described above, the wireless communication unit 12 performs Bluetooth communication using A2DP or AVRCP with the headphones 2. The wireless communication unit 12 transmits a data signal of the audio data 11f by A2DP and receives a remote control signal, the remaining power information of a battery, and the power consumption information by encoding format 21d from the headphones 2 by AVRCP.

The display unit 13 is a display interface for displaying the information such as the title of the audio data 11f being played and the name of the artist as well as the information including the remaining power, the encoding system and the encoding parameter of a current data signal. The display unit 13 is for example a Liquid Crystal Display (LCD) or an organic electroluminescence (EL) display.

The operation unit 14 is an input interface operated by a user to make control to play or stop the audio data 11f. Examples of the operation unit 14 include an input button and a receiving element for receiving a signal from a remote control via an infrared interface. An instruction to play/stop the audio data 11f may be made by transmitting a control signal from the headphones 2 over Bluetooth communication using AVRCP.

The battery 15 supplies electric power to the components of the music reproducing device 1 when the external power input terminal 16 is not connected to the external power source 3. The power that the battery 15 is able to supply is finite. When the external power input terminal 16 is connected to the external power source 3, the battery 15 is recharged by power supplied from the external power source 3.

The external power input terminal 16 is a connection terminal to connect to the external power source 3 and supplies a DC power from the external power source 3 to the components of the music reproducing device 1.

FIG. 3 shows an exemplary configuration of the headphones 2. The headphones 2 include a controller 20, a storage unit 21, a wireless communication unit 22, a speaker 23, an operation unit 24, and a battery 25.

The headphones 2 is a device driven by the battery 25 and operated under control of a power control program 21a, a wireless communication control program 21b, a decoding program 21c, and other control programs (not shown). In particular, the headphones 2 is a wireless communication device that has a feature to decode a data signal of the audio data 11f received by the wireless communication unit 22 by the decoding program 21c and output as audio data the decoded data signal to the speaker 23.

The controller 20 reads the power control program 21a, the wireless communication control program 21b, the decoding program 21c and other control programs (not shown) in the storage unit 21 and controls the components of the music reproducing device 1. An example of the controller 20 is a Central Processing Unit (CPU).

The storage unit 21 is a storage medium such as a Hard Disk Drive (HDD) or a flash memory. The storage unit 21 stores the power control program 21a, the wireless communication control program 21b, the decoding program 21c, and the power consumption information by encoding format 21d.

The power control program 21a has a feature to detect the remaining power (voltage) of the battery 25. The power control program 21a has also a feature to transmit the remaining power information about the remaining power of the battery 25 to the music reproducing device 1 by the wireless communication control program 21b.

The wireless communication control program 21b is a program designed to control the wireless communication unit 22. The wireless communication unit 22 establishes a Bluetooth wireless connection using A2DP or AVRCP with the music reproducing device 1 under the control of the wireless communication control program 21b.

The decoding program 21c decodes a data signal of the audio data 11f from the music reproducing device 1 received by the wireless communication unit 22 to generate a sound signal and outputs sound from the speaker 23 (reproduction processing or decoding operation).

The power consumption information by encoding format 21d is the power consumption amount per unit time by encoding format supported by the decoding program 21c. Specifically, the power consumption information by encoding format 21d is a table of values indicating the sum of the power consumption (per unit time) necessary for the decoding program 21c to perform decoding operation to generate a sound signal by using the decoding program 21c from a data signal received by the wireless communication unit 22 and the power consumption (per unit time) necessary for the wireless communication unit 22 to receive a data signal under the control of the wireless communication control program 21b. In other words, the power consumption information by encoding format 21d includes a plurality of data pieces. Each data piece indicates power consumption in the headphones 2 for processing a digital signal encoded in each of the plurality of encoding formats.

As described above, the wireless communication unit 22 transmits the power consumption information by encoding format 21d to the music reproducing device 1 by the Vender Unique command or the Vender Dependent command of AVRCP. The wireless communication unit 22 need not transmit all items of the power consumption information by encoding format 21d but may transmit data of some of the encoding formats in the table to the music reproducing device 1.

The power consumption information by encoding format 21d has a format similar to that of the power consumption information by encoding format 11e as described above. In the example of FIG. 4, the decoding program 21c supports encoding systems mp3, AAC and SBC as decoding formats and supports high-quality audio and middle-quality audio as an audio quality encoding parameter of each encoding system.

Power consumption of each encoding format in FIG. 4 has been described above and thus is omitted here. More than one encoding parameter may be used similar to the music reproducing device 1, so that the corresponding description is omitted.

The wireless communication unit 22 is a wireless communication interface for communicating with the music reproducing device 1 under the control of the wireless communication control program 21b. Reception of a data signal of the audio data 11f from the music reproducing device 1 and transmission of the remaining power capacity information of the battery 25 and the power consumption information by encoding format 21d to the music reproducing device 1 are made through the wireless communication unit 22.

The speaker 23 outputs sound obtained by decoding a data signal through reproduction (decoding) by the decoding program 21c. When the user listens to the audio data 11f, the user listens to the sound output from the speaker 23. While a headphone-type device is used as a wireless device receiving the audio data 11f in this embodiment and the speaker 23 is described as a component in the headphones 2, this is an example of the sound output part and a sound output terminal such as a headphone jack may be provided.

The operation unit 24 is an input interface operated by a user to make control to play or stop the audio data 11f. An example of the operation unit 24 includes an input button. A control signal corresponding to the input play/stop instruction is transmitted to the music reproducing device 1 over Bluetooth communication using AVRCP.

The battery 25 supplies electric power to the components of the headphones 2. The power that the battery 25 is able to supply is finite.

Operation in the wireless communication system 100 will be explained.

When a user performs an input operation instructing to establish a wireless connection between the music reproducing device 1 and the headphones 2 through the operation unit 14 of the music reproducing device 1 or through the operation unit 24 of the headphones 2, the wireless communication unit 12 controlled by the wireless communication control program 11b and the wireless communication unit 22 controlled by the wireless communication control program 21b establish a wireless connection, for example, in accordance with the method defined in the Bluetooth profiles AVRCP or A2DP thus making available bidirectional wireless communication of a remote control signal or a audio streaming data.

On that occasion, prior to transmission of a audio streaming data, the headphones 2 transmit to the music reproducing device 1 information about encoding formats supported by the decoding program 21c and the power consumption information by encoding format 21d about the power consumption of each encoding format.

The music reproducing device 1 selects an encoding system of a data signal to be encoded by the encoding program 11c and an encoding parameter so that the predicted available transmission time of a data signal will be longest based on an encoding format supported by its encoding program 11c, the power consumption information by encoding format 11e about the power consumption for each encoding format and the power consumption information by encoding format 21d.

In this way, the encoding format selection program 11d selects an encoding system based on the power consumptions for each encoding system in the music reproducing device 1 and the headphones 2 thus allowing transmission/reception control for power saving in consideration of the state of the distant party. It is also possible to extend the available communication time of the entire wireless communication system 100.

When the user performs an input operation instructing streaming reproduction of the audio data 11f through the operation unit 14 of the music reproducing device 1 or through the operation unit 24 of the headphones 2, a data signal encoded by the encoding program 11c of the music reproducing device 1 is transmitted from the music reproducing device 1 to the headphones 2. The headphones 2 receive the data signal by the wireless communication unit 22. The data signal is decoded by the decoding program 21c and output as sound from the speaker 23.

The user can thus listen to the audio data 11f stored in the music reproducing device 1 with the speaker 23 of the headphones 2.

Figure 5:
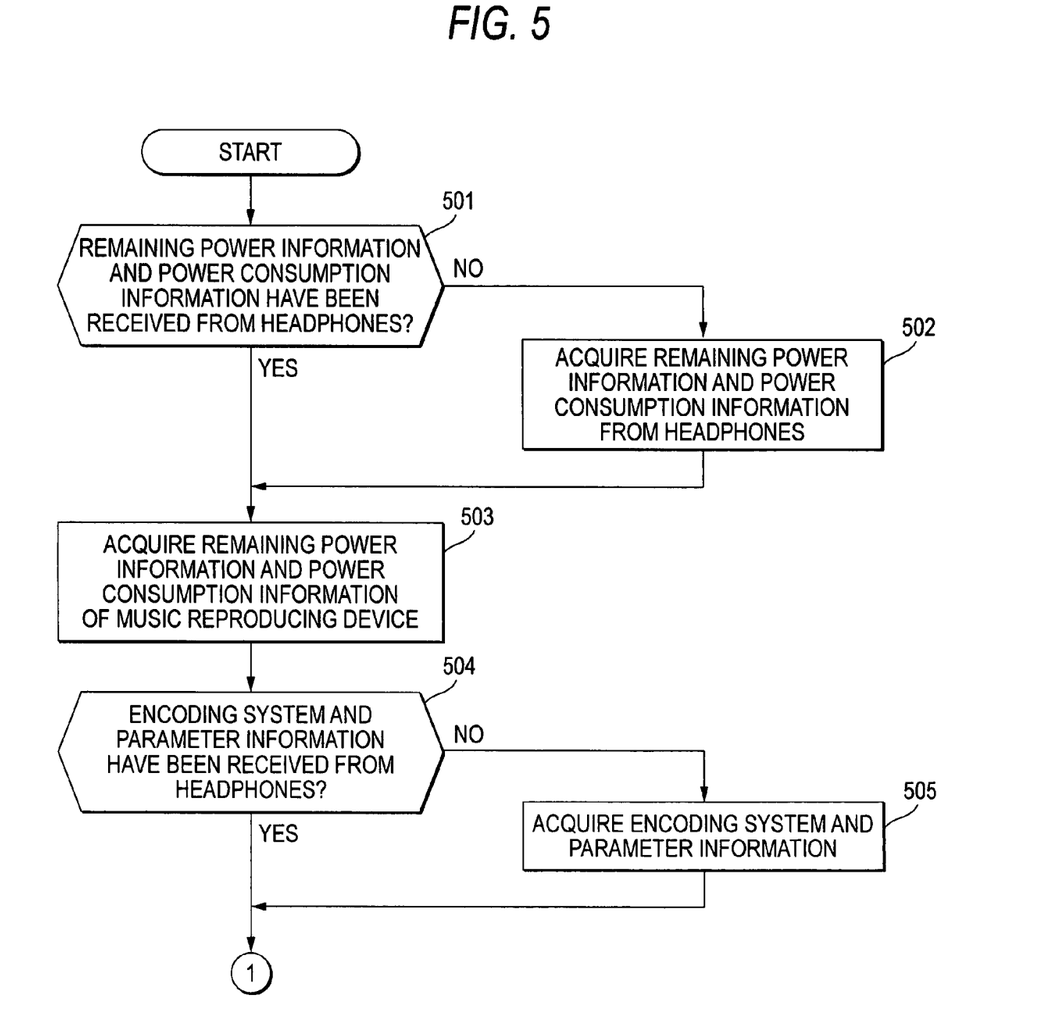
FIG. 5 shows the processing flow of the music reproducing device according to the embodiment.
Figure 6:
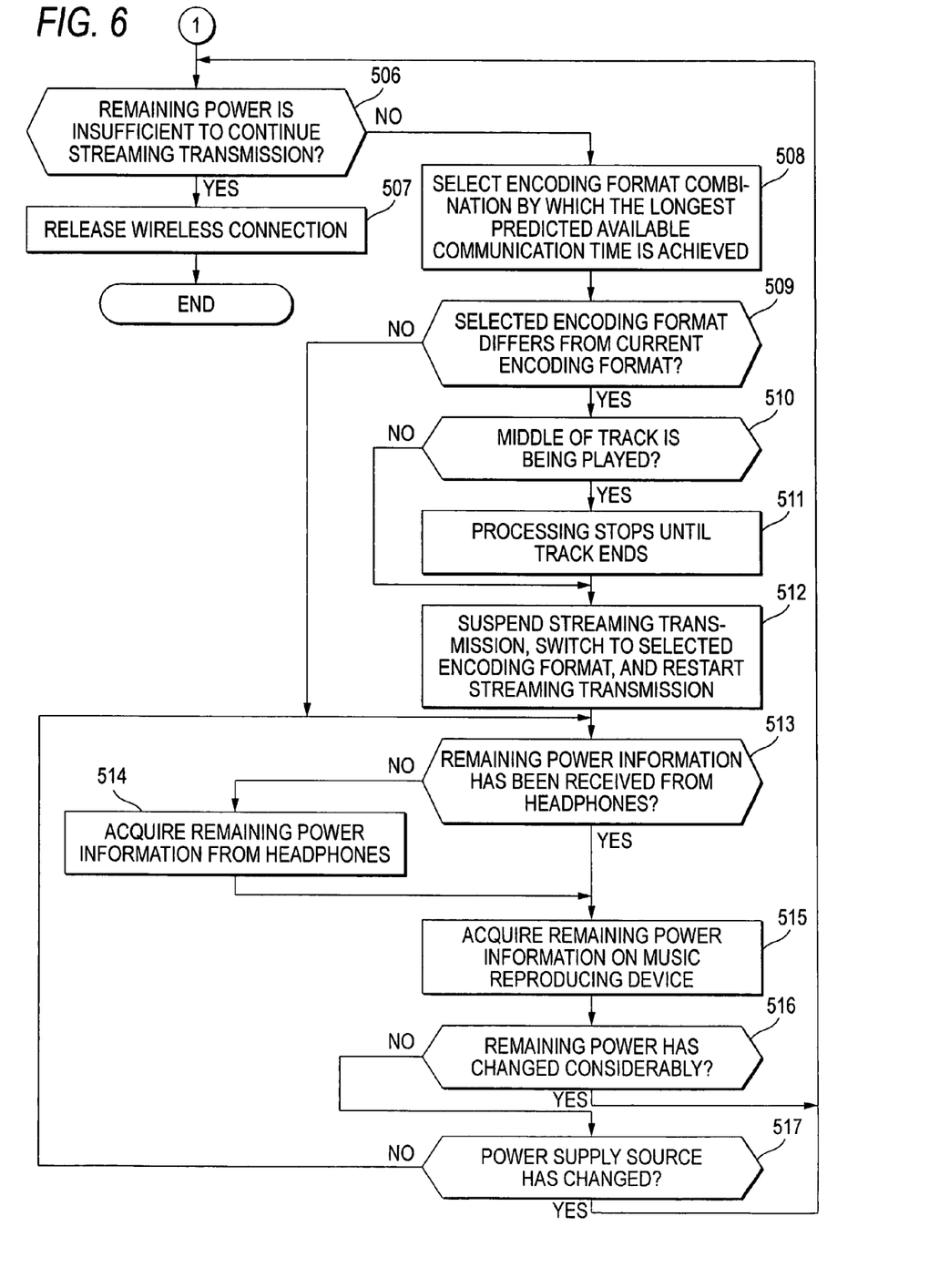
FIG. 6 shows the processing flow of the music reproducing device according to the embodiment.

Next, the processing flow in the music reproducing device 1 will be described referring to FIGS. 5 through 7. FIGS. 5 and 6 are exemplary flowcharts showing the flow of processing in the music reproducing device 1. Assume that, at the beginning of the flowchart of FIG. 5, a Bluetooth connection using AVRCP and A2DP has been already established between the music reproducing device 1 and the headphones 2, but the audio data 11f has not transmitted yet.

While a transmitting side device (the music reproducing device 1) that transmits the audio data 11f as streaming data takes the initiative to perform transmission control of streaming data in this embodiment, the receiving side device (the headphones 2) may take the initiative to perform transmission control.

In the processing of FIG. 5, the encoding format of a data signal transmitted to the headphones is selected. That is, an encoding format is selected before reproduction of the audio data 11*f* is started. By selecting an encoding format based on the power consumption prior to start of reproduction, it is possible to reduce the power consumption compared with a case where the selection of the encoding format is made only halfway through, so that the available communication time is extended longer.

The encoding format selection program 11*d* determines whether information on the remaining power of the battery and the power consumption information by encoding format 21*d* have been received from the headphones 2 (S501). In case such information is not received from the headphones 2 (No in S501), the wireless communication control program 11*b* controls the wireless communication unit 12 and transmits a request to acquire the information on the remaining power of the battery and the power consumption information by encoding format 21*d* to the headphones 2 (S502).

In response to the acquisition request, the headphones 2 uses the power control program 21*a* to detect the remaining power of the battery 25. The wireless communication control program 21*b* controls the wireless communication unit 22 to transmit the information on the remaining power of the battery 25 and the power consumption information by encoding format 21*d* to the music reproducing device 1.

As described above, such information is communicated using the Vendor Unique command or Vendor Depending command of AVRCP.

After receiving the information about the remaining power of the battery 25 and the power consumption information by encoding format 21*d* from the headphones 2 (Yes in S501 or S502), the power control program 11*a* detects remaining power of the battery 15 and passes the information about the remaining power of the battery 15 to the encoding format selection program 11*d* (S503). The encoding format selection program 11*d* reads the power consumption information by encoding format 11*e*.

Next, the encoding format selection program 11*d* determines whether information about an encoding format, that is, an encoding system and an encoding parameter supported by the headphones 2 has been received from the headphones 2 (S504) In A2DP profile, it is normally possible to acquire the information about a supported encoding system and encoding parameter in a negotiation executed for a control channel prior to transmission of streaming data. When the information acquired on that occasion is stored, determination in S504 is Yes.

When the information about the encoding system and encoding parameter supported by the headphones 2 has not been received in S504 (No in S504), the wireless communication control program 11*b* transmits a request to acquire such information to the headphones 2 from the wireless communication unit 12 (S505).

In response to the acquisition request, the wireless communication control program 21*b* of the headphones 2 transmits the information about the encoding system and encoding parameter supported by the decoding program 21*c* to the music reproducing device 1 from the wireless communication unit 22.

When determination in S504 is Yes or after S505 is executed, the wireless communication control program 11*b* determines whether each of the batteries 15 and 25 has remaining power sufficient to continue streaming transmission (S506 in FIG. 6). When at least one of the batteries 15 and 25 is below the remaining power to continue streaming transmission (Yes in S506), the wireless communication control program 11*b* releases the ongoing wireless connection between the wireless communication unit 12 and the headphones 2 (S507).

When both the battery 15 and battery 25 have sufficient remaining power to continue streaming transmission (No in S506), the encoding format selection program 11*d* determines an encoding format combination (encoding system and encoding parameter) by which the longest predicted available communication time of the entire wireless communication system 100 is achieved based on the information about the remaining power of the battery 15, the information about the remaining power of the battery 25, the power consumption information by encoding format 11*e* and the power consumption information by encoding format 21*d*.

After the encoding format of a data signal is determined in S508, the encoding format selection program 11*d* determines whether the encoding format determined in S508 is changed since the last determination, that is, whether the current encoding program 11*c* is the same as the encoding format of the encoding operation (S509). When the encoding program 11*c* has not yet started encoding operation of the audio data 11*f*, determination in S509 is Yes.

When the encoding format is different (Yes in S509), the encoding format selection program 11*d* determines whether the encoding program 11*c* is currently performing encoding operation at a pause between segments of the audio data 11*f*, that is, whether processing is in the middle of a track (S510). When the encoding program 11*c* has not started encoding operation of the audio data 11*f*, determination in S510 is No.

When processing is in the middle of a track (Yes in S510), processing stops until the audio data 11*f* processed by the encoding program 11*c* reaches a break point, that is, until the track ends (S511).

When the encoding program 11*c* performs encoding operation of the audio data 11*f* at a pause between segments (S511 or Yes in S510), the encoding program 11*c* suspends the encoding operation (S512). The wireless communication control program 11*b* pauses current streaming, and performs setting about A2DP together with the headphones 2 for streaming transmission of audio data in the encoding format selected by the encoding format selection program 11*d*.

When A2DP setting is over between the wireless communication unit 12 and the headphones 2, the encoding program 11*c* restarts encoding operation that generates a data signal of the encoding format selected by the encoding format selection program 11*d*. The wireless communication control program 11*b* restarts streaming transmission of the data signal to the headphones 2 through the wireless communication unit 12.

When an encoding format of a data signal is changed, decoding processing in the headphones 2 also changes. Thus, in such a case, generally it is necessary to suspend the ongoing encoding operation. In particular, for Bluetooth communication using A2DP, it is necessary to reconnect new logical connection points each time the encoding format changes. In this embodiment, encoding operation is halted at a breakpoint in the audio data 11*f* (a breakpoint in data means an inter-track pause when the audio data is stored in the form of separate tracks) and the resetting is made. This reduces the user discomfort caused by a sudden stop of reproduction in the middle of a track.

It goes without saying that interruption of streaming transmission is unnecessary before the encoding program 11*c* starts encoding operation of the audio data 11*f*, that is, before the audio data 11*f* is reproduced.

After streaming is restarted, the power control program 11*a* determines whether the information about the remaining power of the battery 25 is received again from the headphones 2 (S513). When the information is not received from the headphones (No in S513), the wireless communication control program 11*b* controls the wireless communication unit 12 to transmit a request to acquire the information about the remaining power of the battery 25 to the headphones 2 (S514).

In response to the acquisition request, the headphones 2 uses the power control program 21*a* to detect the remaining power of the battery 25. The wireless communication control program 21*b* controls the wireless communication unit 22 to transmit the information about the remaining power of the battery 25 to the music reproducing device 1.

As described above, information about the remaining power of the battery is communicated using the Vendor Unique command or Vendor Depending command of AVRCP in this embodiment.

After receiving the information about the remaining power of the battery 25 from the headphones 2 (Yes in S513 or S514), the power control program 11*a* detects the remaining power of the battery 15 (S515).

The power control program 11*a* determines whether the remaining power of the battery 15 of the music reproducing device 1 or the battery 25 of the headphones 2 has considerably changed with respect to the initially expected capacity (S516). Specifically, the power control program 11*a* determines whether the battery power has decreased at least by a predetermined amount from the predicted remaining power since the encoding format was changed last time.

When it is determined in S516 that the remaining power of the battery 15 has considerably changed (Yes in S516), processing is returned to S506 to select an encoding format again.

When the remaining power is almost the same as expected (No in S516), the power control program 11*a* determines whether the power supply source of the music reproducing device 1 or headphones 2 has changed (S517). For the music reproducing device 1, in case the battery 15 was supplying power when an encoding format was selected in S508, the power control program 11*a* determines whether the external power input terminal 16 is connected to the external power source 3. Similarly, in case the external power input terminal 16 was connected to the external power source 3 when an encoding format was selected in S508, the power control program 11*a* determines whether the external power input terminal 16 is disconnected from the external power source 3 and the battery 15 has started supplying power.

While not shown in this embodiment, determination in S517 is Yes even when power from the external power supply source can be supplied to the headphones 2.

When the power supply source has not changed (No in S517), the music reproducing device 1 continues streaming transmission of a data signal of the audio data 11*f* to the headphones 2 in the same encoding format selected in S508, and processing returns to S513.

When the power supply source has changed in the determination in S517 (Yes in S517), processing returns to S506 and an encoding format is selected again (Yes in S517).

When the power supply source of the music reproducing device 1 is the external power source 3, the available communication time of the music reproducing device 1 may be assumed as infinite and an encoding format may be selected considering the available communication time of the headphones 2 alone. When the power supply source of the music reproducing device 1 is the battery 15, an encoding format is necessary to be selected while considering the available communication time of the entire wireless communication system 100 including the battery 15 of the music reproducing device 1 and the battery 25 of the headphones 2.

In this embodiment, an encoding format is selected again in accordance with a change in the power supply source in S517. It is thus possible to flexibly select an encoding format in accordance with the situation.

While selection of an encoding format in blocks S501 through S512 before starting the reproduction (encoding operation) of the audio data 11*f*, when the power supply source is changed, or when the remaining power is substantially changed, the invention is not limited thereto. For example, processing in blocks S501 through S512 may be performed periodically at predetermined intervals.

Figure 7:
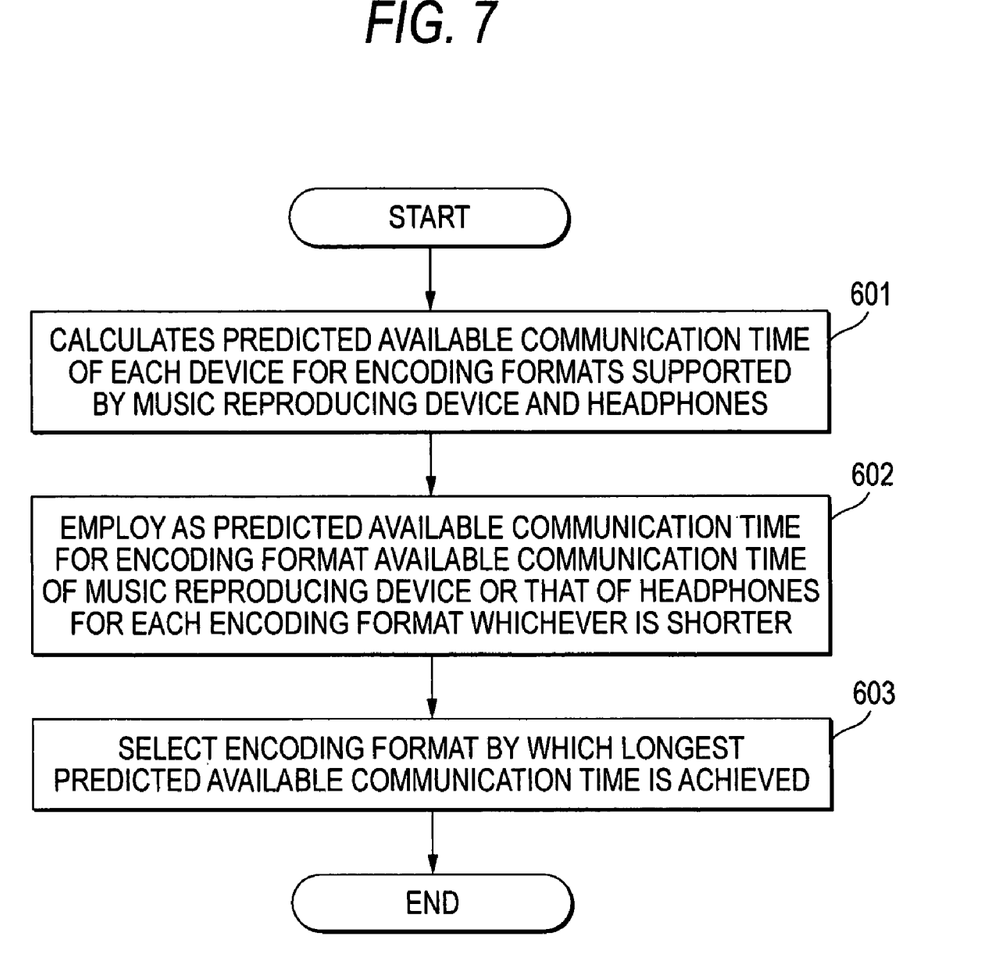
FIG. 7 shows the processing flow of the music reproducing device according to the embodiment.

FIG. 7 is an exemplary flowchart showing the details of the processing in S508 in FIG. 6.

The encoding format selection program 11*d* calculates the predicted available communication time of each device for the encoding formats supported by the music reproducing device 1 and the headphones 2 (S601).

The predicted available communication time of each device for a data signal of a particular encoding format is calculated by dividing the remaining power of each device by the power consumption per unit time for the encoding format. It goes without saying that, when the external power input terminal 16 is connected to the external power source 3, the predicted available communication time of the music reproducing device 1 is infinite irrespective of the encoding format selected.

The encoding format selection program 11*d* obtains the available communication time of the entire wireless communication system 100 for each encoding system (S602). The available communication time of the entire system is the predicted available communication time of the music reproducing device 1 or that of the headphones 2 whichever is the shorter.

When the external power input terminal 16 is connected to the external power source 3, the predicted available communication time of the music reproducing device 1 is infinite irrespective of the encoding format selected as described earlier. Thus, the predicted available communication time of the entire wireless communication system 100 always matches the predicted available communication time of the headphones 2.

The encoding format selection program 11*d* selects an encoding format by which the longest predicted available communication time of the entire wireless communication system 100 is achieved (S603).

As described above, the music reproducing device 1 according to this embodiment handles the information about remaining power and power consumption of the headphones 2 together with that of the music reproducing device 1, and thereby properly performing data transmission control in accordance with the remaining power of the entire wireless communication system 100.

How much the remaining power of each device may be when the music reproducing device 1 and headphones 2 are connected wirelessly, it is possible to update the information on the remaining power of the each device to select the best approach depending on the information, thereby enhancing the convenience to the user.

In this embodiment, the music reproducing device 1 may be another type of device and the headphones 2 is not limited to wireless headphones but may be another type of device.

While a data signal transmitted is for music data in this embodiment, the invention is not limited thereto. For example, streaming data may be video data.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. A wireless communication device comprising:
a first battery that supplies power to the wireless communication device;
a power control module that detects a remaining power amount in the first battery;
a first power consumption information module that determines first power consumption information including a plurality of data pieces each indicating power consumption in the wireless communication device for processing a streaming data signal encoded in each of a plurality of encoding formats;
a wireless communication unit that wirelessly receives second power consumption information from a second device that is powered by a second battery, the second power consumption information including a plurality of data pieces each indicating power consumption in the second device for processing the streaming data signal encoded in each of the plurality of encoding formats, the wireless communication unit further receiving a remaining power amount of the second battery;
an encoding format selection module that selects one of the encoding formats for a data signal to be transmitted, based on the first power consumption information, the second power consumption information, remaining power amount of the first battery, and the remaining power amount of the second battery; and
an encoding controller that encodes the data signal to be transmitted in the encoding format selected by the encoding format selection module to generate an encoded data signal as a streaming data and outputs the encoded data signal to the wireless communication unit,
wherein the wireless communication unit wirelessly transmits the encoded data signal as the streaming data to the second device.

2. The wireless communication device according to claim 1, wherein the encoding format selection module selects the encoding format that the encoding controller and the second device both support, and in which the power consumption for processing the streaming data signal encoded is smallest.

3. The wireless communication device according to claim 1, wherein the power consumption indicated by each of the data pieces includes power consumption in a wireless communication between the wireless communication unit and the second device and decoding the streaming data signal encoded in each of the plurality of encoding formats, in the second device.

4. The wireless communication device according to claim 1, wherein the encoding format selection module selects the encoding format that the encoding controller and the second device both support and in which a sum of power consumption in the wireless communication device and in the second device for processing the data signal is smallest.

5. The wireless communication device according to claim 1, wherein the encoding format selection module selects the encoding format that the encoding controller and the second device both support and for which a shorter one of an available processing time of the second device and an available processing time of the wireless communication device is longest.

6. The wireless communication device according to claim 1, wherein the power consumption indicated by each of the data pieces in the first power consumption information includes power consumption in a wireless communication between the wireless communication unit and the second device and encoding the data signal in each of the plurality of encoding formats by the encoding controller.

7. The wireless communication device according to claim 1, wherein the encoding format selection module selects the encoding format before the encoding controller starts encoding of the data signal.

8. The wireless communication device according to claim 1, further comprising an external power input unit that receives a power supply from an external power source,
wherein the encoding format selection module selects the encoding format when the external power input unit starts receiving the power supply from the external power source.

9. The wireless communication device according to claim 1, wherein the encoding format selection module selects the encoding format in response to a change in the remaining power of the first battery and the remaining power of the second battery.

10. The wireless communication device according to claim 8, wherein the encoding format selection module selects the encoding format at a breakpoint of the data signal to be transmitted.

11. The wireless communication device according to claim 1, wherein each of the encoding formats includes an encoding system and at least one of parameters required for encoding the data signal by the encoding controller.

12. A wireless communication system comprising:
a first wireless communication device that wirelessly transmits a data signal as a streaming data; and
a second wireless communication device that wirelessly receives the data signal transmitted from the first wireless communication device,
wherein the first wireless communication device includes:
a first battery that supplies power to the first wireless communication device;
a first power control module that detects a remaining power amount in the first battery;
a first power consumption information module that determines a first power consumption information including a plurality of data pieces each indicating power consumption in the first wireless communication device for processing a streaming data signal encoded in each of a plurality of encoding formats;
an encoding format selection module that selects an encoding format for the data signal to be transmitted to the second wireless communication device;
an encoding controller that encodes the data signal to be transmitted in the encoding format selected by the encoding format selection module to generate an encoded data signal as a streaming data; and
a first wireless communication unit that wirelessly transmits the generated data signal,
wherein the second wireless communication device includes:
a second battery that supplies power to the second wireless communication device;

a second power control module that detects remaining power amount in the second battery;

a second power consumption information that determines a second power consumption information including a plurality of data pieces each indicating power consumption in the second wireless communication device for processing a streaming data signal encoded in each of a plurality of encoding formats;

a second wireless communication unit that wirelessly receives the data signal transmitted from the first wireless communication unit; and a decoding controller that decodes the data signal received by the second wireless communication unit;

wherein the second wireless communication unit is configured to wirelessly transmit the second power consumption information and the remaining power amount in the second battery to the first wireless communication unit, wherein the first wireless communication unit is configured to wirelessly receive the second power consumption information and the remaining power amount in the second battery transmitted from the second wireless communication unit, and wherein the encoding format selection unit selects the encoding format from among the plurality of encoding formats based on the first power consumption information, the second power consumption information, the remaining power amount of the first battery, and the remaining power amount of the second battery.

13. The wireless communication system according to claim 12, wherein each of the encoding formats includes an encoding system and at least one of parameters required for encoding the data signal by the encoding controller.

14. A wireless communication device that wirelessly communicates with a terminal, the wireless communication device comprising:

a memory;

a first battery that supplies power to the wireless communication device;

a power control module, residing in the memory, that detects a remaining power amount in the first battery;

a first power consumption information module, residing in the memory, that determines a first power consumption information including a plurality of data pieces each indicating power consumption in the wireless communication device for processing a streaming data signal encoded in each of a plurality of encoding formats;

a processor provided to be accessible to the memory, the processor being operable to perform a process comprising:

wirelessly receiving a second power consumption information from the terminal that is powered by a second battery, the second power consumption including a plurality of data pieces, each data piece indicating power consumption in the terminal for processing a streaming data signal encoded in each of a plurality of encoding formats, wirelessly receiving a remaining power amount of the second battery;

selecting one of the encoding formats for a data signal to be transmitted, based on the received first power consumption information, the second power consumption information, remaining power amount of the first battery, and the remaining power amount of the second battery;

encoding the data signal to be transmitted in the selected encoding format to generate an encoded data signal as a streaming data; and wirelessly transmitting the encoded data signal to the terminal as the streaming data.

* * * * *